United States Patent
Olatunde

(10) Patent No.: US 10,408,186 B2
(45) Date of Patent: Sep. 10, 2019

(54) COMBINED PUMP AND TURBINE

(71) Applicant: Adebukola Olatunde, Mississauga (CA)

(72) Inventor: Adebukola Olatunde, Mississauga (CA)

( * ) Notice: Subject to any disclaimer, the term of this patent is extended or adjusted under 35 U.S.C. 154(b) by 0 days.

(21) Appl. No.: 15/354,654

(22) Filed: Nov. 17, 2016

(65) Prior Publication Data

US 2017/0138213 A1    May 18, 2017

Related U.S. Application Data

(60) Provisional application No. 62/256,134, filed on Nov. 17, 2015.

(51) Int. Cl.
| | |
|---|---|
| *F01D 15/08* | (2006.01) |
| *F03B 3/10* | (2006.01) |
| *F04D 13/02* | (2006.01) |
| *F04D 13/06* | (2006.01) |
| *F03B 13/00* | (2006.01) |
| *F03B 15/08* | (2006.01) |

(52) U.S. Cl.
CPC .............. *F03B 3/103* (2013.01); *F03B 13/00* (2013.01); *F03B 15/08* (2013.01); *F04D 13/02* (2013.01); *F04D 13/06* (2013.01); *F05B 2220/602* (2013.01); *F05B 2220/706* (2013.01); *F05B 2260/4023* (2013.01); *F05B 2270/327* (2013.01); *Y02B 10/50* (2013.01); *Y02E 10/223* (2013.01); *Y02E 10/226* (2013.01)

(58) Field of Classification Search
CPC . F01D 15/08; F01D 5/02; F01D 15/10; F03B 1/00; F03B 3/103; F03B 13/00; F03B 15/08; F04D 13/02; F04D 13/06
USPC ......................................... 290/43, 54
See application file for complete search history.

(56) References Cited

U.S. PATENT DOCUMENTS

| | | | | |
|---|---|---|---|---|
| 2,962,599 | A * | 11/1960 | Pirkey ...................... | E02B 9/00 290/4 R |
| 4,364,228 | A | 12/1982 | Eller | |
| 4,406,578 | A * | 9/1983 | Tsunoda .................. | F03B 3/103 290/52 |
| 5,864,183 | A * | 1/1999 | Fisher, Jr. ............... | F03B 13/06 290/40 C |
| 6,748,737 | B2 * | 6/2004 | Lafferty .................... | F03D 9/12 290/44 |
| 6,784,562 | B2 * | 8/2004 | Gennesseaux ........ | F24D 11/005 290/2 |
| 7,804,182 | B2 | 9/2010 | DeAngeles | |
| 8,356,532 | B1 * | 1/2013 | Dailey .................... | B60K 6/105 74/571.11 |
| 8,536,723 | B2 | 9/2013 | Roos | |
| 8,763,625 | B1 | 7/2014 | Carter | |
| 8,941,340 | B2 | 1/2015 | Meiners et al. | |
| 2006/0082159 | A1 * | 4/2006 | Scharfspitz ............... | F03G 3/00 290/1 R |

(Continued)

*Primary Examiner* — Viet P Nguyen

(74) *Attorney, Agent, or Firm* — Lowenstein Sandler LLP

(57) ABSTRACT

A combined pump and turbine (electromechanical converter), which may be operable as a motorized centrifugal pump for starting a siphon and as an electromechanical turbine particularly for transmission of a liquid, such as water, in a water treatment plant. Recovery of energy from liquid flow with the combined pump and turbine, particularly in water treatment applications, allows for increased energy gains.

16 Claims, 15 Drawing Sheets

(56) References Cited

U.S. PATENT DOCUMENTS

| | | | |
|---|---|---|---|
| 2009/0193808 A1* | 8/2009 | Fiske | F03D 9/026 60/721 |
| 2010/0077749 A1* | 4/2010 | Riley | F24J 3/081 60/641.2 |
| 2010/0140935 A1* | 6/2010 | Paoli | F03B 3/103 290/43 |
| 2010/0270801 A1* | 10/2010 | Liu | F01D 15/10 290/52 |
| 2011/0133487 A1* | 6/2011 | Oklejas, Jr. | F03G 7/005 290/1 R |
| 2012/0056430 A1* | 3/2012 | Aaltonen | F03B 13/06 290/52 |
| 2012/0169054 A1* | 7/2012 | Roos | F03B 3/04 290/52 |
| 2014/0103661 A1* | 4/2014 | Kacludis | F02C 1/04 290/54 |
| 2014/0367966 A1* | 12/2014 | Odegard | F04B 49/002 290/7 |

* cited by examiner

1. Electrical Control Unit (ECU).
2. Motor Control Unit (MCU).
3. Alternatively, electrical storage, may take place of electric grid meter or be placed in addition to electrical grid meter.

1. Electrical Control Unit (ECU).
2. Motor Control Unit (MCU).
3. Alternatively, electrical storage, may take place of electric grid meter or be placed in addition to electrical grid meter.

COMBINED PUMP AND TURBINE

CROSS REFERENCE TO RELATED APPLICATIONS

This application claims priority under 35 U.S.C. § 119 to U.S. provisional application No. 62/256,134, filed Nov. 17, 2015, the contents of which are entirely incorporated by reference.

BACKGROUND OF THE INVENTION

Field of the Invention

This disclosure relates to a combined pump and turbine (electromechanical converter) and more specifically to a motor-generator centrifugal pump assembly, which may be operable as a motorized centrifugal pump for starting a siphon and successively as an electromechanical turbine particularly for transmission of a liquid such as water.

Description of the Related Technology

In order to recover potential energy of liquid pressure in such applications as water treatment, water distribution and pumped storage hydroelectricity, it is known that a centrifugal pump running in reverse is operable as a turbine to convert liquid pressure into electromechanical energy. Reversible centrifugal pump machines are used in cases of pumped storage hydroelectricity applications where a reversible pump allows pumping in one direction and electricity generation in the reverse direction of flow. This is used in typical pumped storage hydroelectricity applications for off-peak pumping and on-peak power generation. The reversible machine set is not useful for single directional flow applications such as siphon-driven water treatment.

Recovery of energy from liquid flow, particularly in water treatment applications, has heretofore required that a pump, be used to transmit liquid, and a second separate pump, located downstream, be run in reverse to recover mechanical energy from the pressurized liquid. The use of a two machine set, to transmit liquid and for electromechanical energy conversion, limits the net energy gain. This limitation is due to the electrical energy consumption of the first pump including the related control means. Furthermore, the larger footprint due to multiple pathways for flow required for two separate devices is disadvantageous due to increased capital costs, and increased operation and maintenance costs.

Accordingly it would be advantageous to provide a device that overcomes these shortcomings.

SUMMARY

The present disclosure relates to a combined pump and turbine comprising: a pump; an electromechanical converter operably coupled to the pump, the electromechanical converter having a motor condition and a generator condition; and a control unit operably connected to the electromechanical converter for switching the electromechanical converter between the motor condition and the generator condition. The electromechanical converter may be an integrated motor-generator. The pump may be a centrifugal pump. The pump may have a pump shaft and the electromechanical converter may have a rotor shaft, wherein the pump shaft and the rotor shaft are a common drive shaft. The control unit may comprise a regenerative variable frequency drive. The regenerative variable frequency drive may control the speed of the pump. The regenerative variable frequency drive may absorb electrical energy from the electromechanical converter. The combined pump and turbine may include a flywheel operably connected between the pump and the electromechanical converter. The flywheel may be operably connected to the control unit, wherein the flywheel is engaged and disengaged to the pump responsive to a control from the control unit.

A plant comprising: a liquid storage tank; a combined pump and turbine 10 operably connected to the water storage tank; and a surge tank operably connected to the combined pump and turbine.

A method of starting fluid flow in a plant comprising the steps of: starting siphon flow by pumping liquid from a liquid storage tank; siphon flow driving liquid flow through pump turning an electromechanical converter; an electromechanical converter converting mechanical energy to electrical energy; store/transmit energy; and output liquid into a surge tank or reservoir. The combined pump and turbine 10 may be used to pump the liquid and produce energy while operating in the same direction.

A method wherein a combined pump and turbine switches, at least once, between motor and generator conditions while operating in the same direction. The at least one switch may be made based on a pre-determined rotational speed. The at least one switch may be made based on a predetermined set point. The at least one switch may be made in response to a pre-determined digital signal. The digital signal may be from a flow transmitter. The at least one switch may be made based on an electronic permissive.

Further features will be disclosed or will become apparent in the course of the following detailed description.

BRIEF DESCRIPTION OF THE DRAWINGS

The embodiments will now be disclosed with reference to the accompanying drawings, in which.

DETAILED DESCRIPTION OF CERTAIN INVENTIVE EMBODIMENTS

The devices shown herein are particularly useful in implementation in water treatment plants and/or water distribution systems and do not exclude other applications for implementation of the said devices.

The devices shown herein are particularly useful in applications of siphon flow and/or gravity siphon flow, which require pumping to establish the siphon where both the pumped flow and siphon occur in the same direction. Such applications possess enough energy generation potential from the liquid pressure to warrant pumping and power generation in the same direction. The conversion of fluid flow over pump impellers to pump drive shaft rotational speed is more efficient than the conversion of pump drive shaft rotational speed to fluid flow. The energy output of a centrifugal pump, when driven by flow, is higher than the energy input required to drive the pump to produce that said flow. A device capable of pumping and generation in the same direction of flow is advantageous to make use of this higher operation efficiency.

Siphon liquid flow is typically unidirectional and typically requires pumping and/or gravity-driven flow to initiate the siphon. In siphon driven water treatment plants, siphon flow may be disrupted during a temporary loss of gravitational potential energy in the liquid due to entrance of air into the system or due to other hydraulic issues. For most applications it would be advantageous to employ an especially compact design by providing a single device capable of pumping as required to start and to restore siphon flow, and upon siphon flow, to generate power. Such a device would also be advantageous to prevent damage to a conventional centrifugal pump when a siphon occurs causing flow rates to occur outside the pump's performance curve. In addition it would be advantageous to avoid redundant/parallel piping installations and manual operation of conventional centrifugal pumps in order to restore flow for incidents of siphon breaks.

Further opportunities for the use of a single device/machine capable of pumping and power generation in a single direction of flow may exist in the role of pump deceleration in water treatment and water distribution applications. It is known that a lag time exists in the time for the rotor 62 of a pump to decelerate from motion to rest. It would be advantageous to employ a device in such an application that can fulfill the purpose of regenerative energy recovery during the deceleration time of the rotor 62.

Use of a combined pump and turbine device has not been considered previously in connection with liquid transmission and energy recovery, particularly in water treatment and distribution. This is believed to be due to unrecognized energy recovery magnitudes and generation efficiency inherent in siphon fluid flow applications such as siphon driven water treatment plants or siphon driven power generation.

Figure 1:
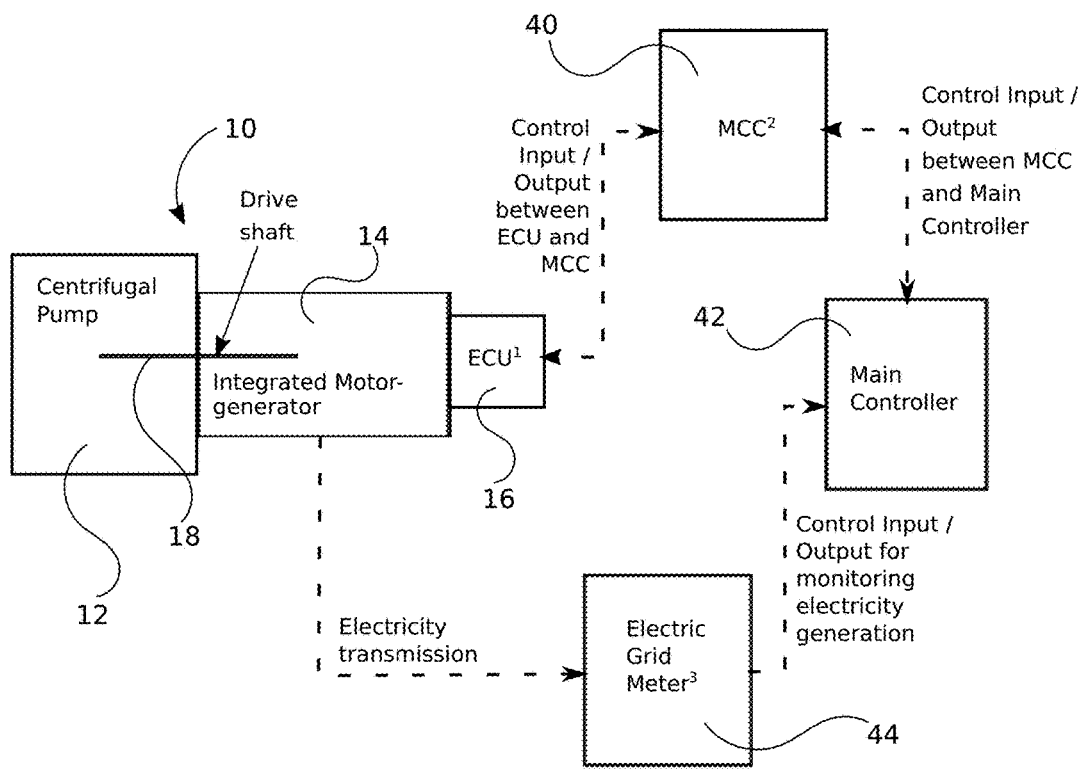
FIG. 1 is a schematic representation of a combined pump and turbine in arrangement with an electrical transmission, a motor control unit and a main controller.

Referring to FIG. 1, a combined pump and turbine 10 is shown generally at 10. The combined pump and turbine 10 includes a centrifugal pump 12, an electromechanical converter or integrated motor-generator (IMG) 14 (disclosed in detail below) and an electrical controller unit (ECU) 16. The rotor 62 of the integrated motor-generator 14 and the shaft of the impeller of the centrifugal pump 12 are operably connected. Preferably a common drive shaft 18 is used to connect the rotor 62 of the integrated motor-generator 14 to the shaft of the impeller of the centrifugal pump 12.

Figure 2:
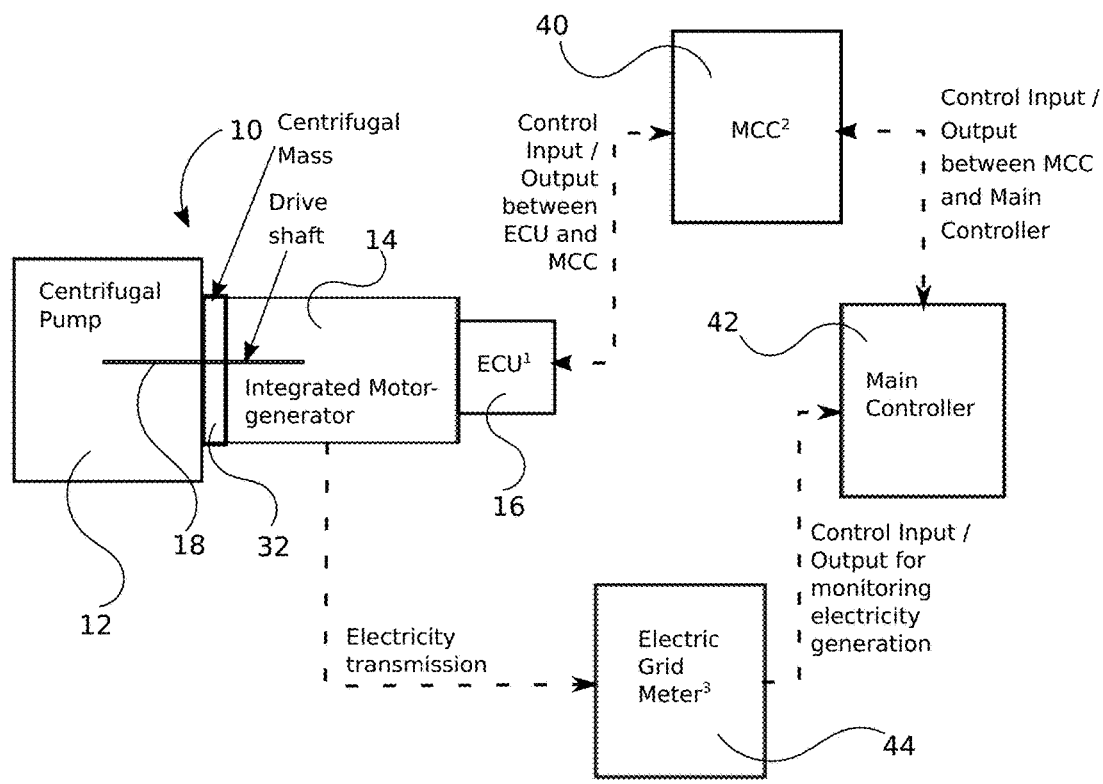
FIG. 2 is a schematic representation of an alternate embodiment of a combined pump and turbine in arrangement with a centrifugal mass, an electrical transmission, a motor control unit and a main controller.

Turning to FIG. 2, an alternate combined pump and turbine is shown at 30. Combined pump and turbine 30 is similar to that shown at 10 but it further includes a centrifugal mass 32. In any embodiment of the invention, combined pump and turbine 10 and combined pump and turbine 30 may be interchanged.

The typical embodiment of the drive arrangement, shown in FIGS. 1 and 2, includes a pump, shown as a centrifugal pump 12, a mechanical electrical converter, shown as an integrated motor-generator (IMG) 14, an electronic control unit (ECU) 16 and a transmission shaft, shown as a shaft 18 between the pump 12 and the integrated motor-generator 14.

The integrated motor-generator 14 is comprised of an electrical machine which may include a stator 72 and a rotor 62, a converter comprising of a regulator, a modulator, switches and filters and an inverter may also be included in the electrical machine depending on the desired required voltage output. The integrated motor-generator component may include an induction, permanent magnet, switch reluctance and/or brushless configuration. The stator 72 is secured in the integrated motor-generator housing, which is secured to the pump. The rotor 62 of the integrated motor-generator is mechanically or magnetically coupled to the shaft of the pump and is driven by the integrated motor-generator or pump impeller in the same direction of rotation for both cases.

An electrical controller unit 16 is provided to control the condition of the integrated motor-generator 14. The electrical controller unit includes a programmable digital computer that may be fixed to the device or remotely situated. The electrical controller unit 16 controls the operation of the integrated motor-generator to switch between motor operation and generator operation. In this arrangement of the integrated motor-generator coupled directly to the pump, it remains that the integrated motor-generator shares the same shaft with the pump driveshaft. In this environment, a regenerative function of the combined pump and turbine 10 is limited to the time fluid flow decelerates the pump impeller and therein rotor 62 of the integrated motor-generator to standstill. The electrical controller unit 16 also controls the electricity generation cycle of the integrated motor-generator 14 which may include power transmission, and the supply of electricity to the integrated motor-generator 14 for motorized pumping. This entails that it may dictate the field current, which may be by way of a microprocessor to allow the system to defer power transmission and receive power, until the integrated motor-generator is in its generator function.

Although a centrifugal pump has been disclosed herein, the combined pump and turbine is not limited to only a centrifugal type pump arrangement. Alternatively, in place of a centrifugal pump, any pump capable of receiving mechanical energy from fluid pressure and transferring said energy through a mechanical rotational couple, such as a shaft coupled to the integrated motor-generator component, may be used. Although a combined pump and turbine, using an integrated motor-generator comprising a single stator and rotor arrangement, has been disclosed herein, the combined pump and turbine is not limited to only a single stator and rotor arrangement. Alternatively, in place of a single stator and rotor arrangement, any quantity of stator and rotor arrangement capable of generating energy and operating as a motor, such as a double stator and rotor arrangement, may be used.

Alternatively, the drive arrangement of the combined pump and turbine may include a centrifugal mass (flywheel component) 32. According to the variation, shown in FIG. 2, the embodiment of the drive arrangement includes a centrifugal pump 12, an integrated motor-generator 14, an electrical controller unit 16, a shaft 18 between the centrifugal pump and IMG, and a centrifugal mass 32 between the pump and the integrated motor-generator 14, in which the mass and its transmission shaft is capable of being disconnected from the pump by an additional coupling such as a clutch. In this way, the centrifugal mass 32 may be used advantageously for regenerative deceleration of the integrated motor-generator 14 by disconnecting the centrifugal mass from the pump while stored mechanical energy in the mass continues to drive the integrated motor-generator 14 as a generator. The centrifugal mass 32 may comprise a flywheel, such as a disk, and/or the rotor of the integrated motor-generator for a more compact design.

In regard to combined pump and turbine 30, the electrical controller unit 16 also controls the regenerative function of the integrated motor-generator 14 through the engagement and disengagement of the flywheel 32 to the pump drive shaft 18. A regenerative function may refer to when the mechanical storage device operably decouples, by way of a clutch, from the pump driveshaft while remaining coupled to the integrated motor-generator that is operating as a generator. When the integrated motor-generator device returns to the driving mode as a motor, a clutch re-engages the flywheel to the pump driveshaft, therein allowing the integrated motor-generator to drive the pump impellers. The potential for stored mechanical energy to remain in the flywheel, at re-engagement to the pump, is advantageous to reduce the amount of breakaway torque required by the integrated motor-generator machine to overcome the static torque of the pump impellers to move said impellers from standstill. Typically, the combined pump and turbine 10 or 30 may be operably connected to a motor control unit 40. The motor control unit 40 controls the input/output between the electrical controller unit 16 and a variable frequency drive (VFD) or regenerative variable frequency drive (RVFD). The VFD or RVFD allows a pump to run at variable speeds by changing the frequency (Hz) supplied to the motor driving the pump.

The motor control unit 40 may be operably connected to a main controller 42. The main controller 42 may exchange electronic signals with the regenerative variable frequency drive that is operably connected to the motor control unit 40. The integrated motor-generator 14 may be operably connected to an electric grid meter 44 and the electricity that is generated in the integrated motor-generator 14 may be transmitted to the electric grid meter 44. The electric grid meter 44 may be also operably connected to the main controller 42 and it may measure the electricity generated and/or supplied. The combined pump and turbine may alternatively comprise an electrical storage unit in conjunction with or in replacement of the electric grid meter 44.

Figure 3:
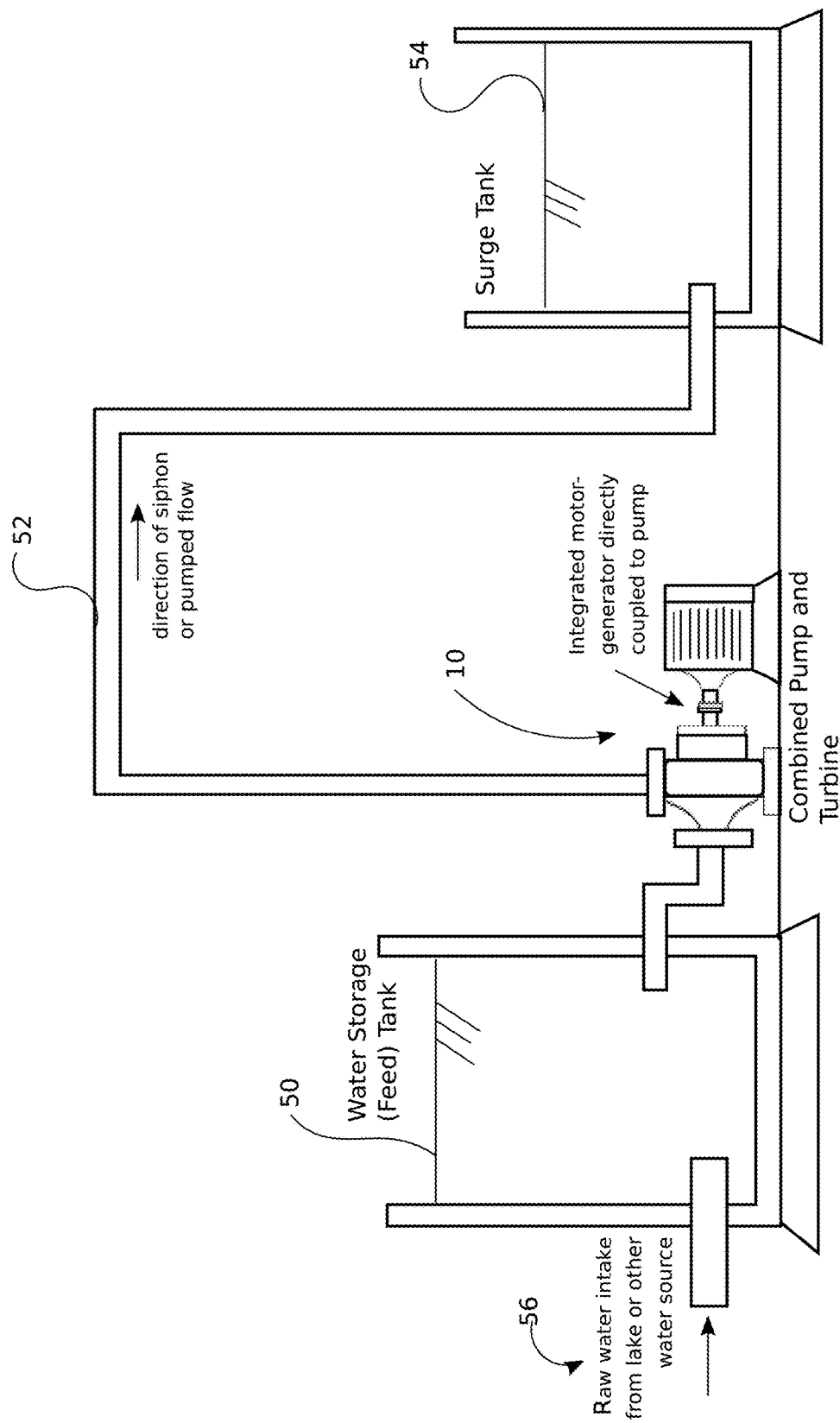
FIG. 3 is a representation of a combined pump and turbine used as a combined pump and turbine in a water treatment plant.

Turning now to FIG. 3, the combined pump and turbine disclosed herein may be used in a number of different applications. The combined pump and turbine 10 may be used as a combined pump and turbine in a water treatment plant. The combined pump and turbine 10 may be operably connected to a water storage tank 50 or reservoir. The water is pumped up into pipes 52 and then into a surge tank 54. The water storage tank 50 may be connected to a raw water intake such as a lake or other body of water 56. It will be appreciated by those skilled in the art that the water level in the water storage tank 50 may be supplied by the static pressure of the raw water source, such as a lake, or a water supply point at a higher gravitational grade. The combined pump and turbine 10 starts the siphon by drawing water into the pipes 52, and once the pipes 52 remain full, and continuous siphon flow has started, the water may be drawn into the pipes through a siphon action allowing the combined pump and turbine 10 to switch from pumping operation to turbine operation.

Figure 4:
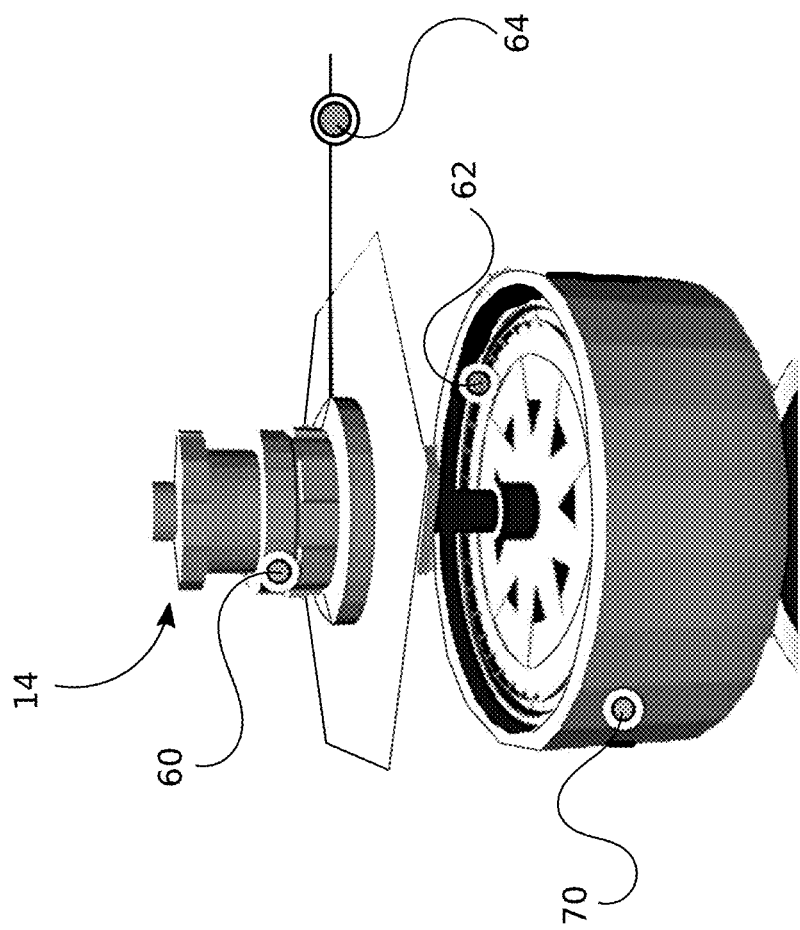
FIG. 4 is an exploded representation of a combined pump and turbine used as a combined pump and turbine.
Figure 5:
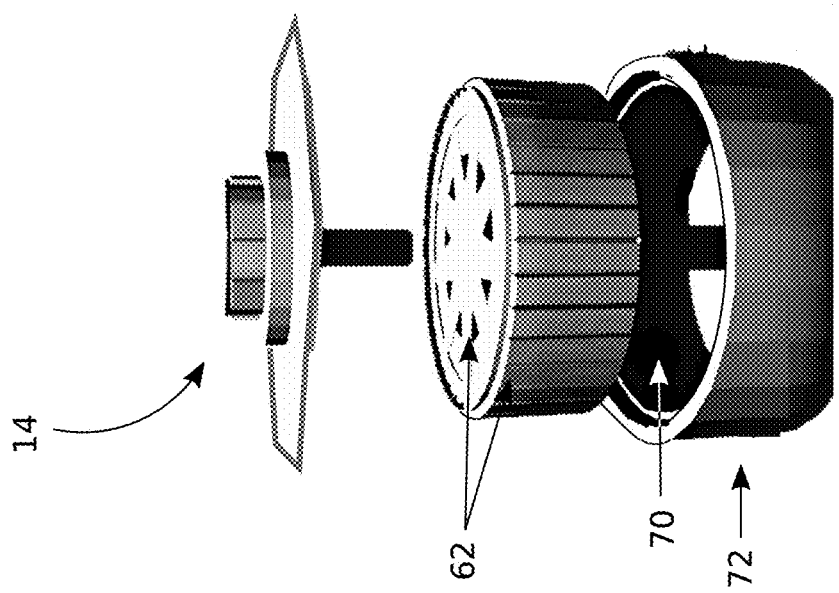
FIG. 5 is an exploded representation of a combined pump and turbine used as a combined pump and turbine.

Turning now to FIGS. 4 and 5, alternatively, the device may be started in motor operation. An external power source may supply an electrical current to stator 72 windings 70. The stator 72 windings 70 may provide a magnetic field to rotate the rotor 62. The rotor 62 may be directly coupled to the pump drive shaft which may be itself directly coupled to the impeller blades, or may be alternatively coupled to the impeller blades via a flywheel and clutch assembly. The impeller blades may drive the water, or fluid, through the volute (fluid housing) of a centrifugal pump 12. The rotor 62 of the integrated motor-generator 14 may rotate below a pre-determined speed, and/or below some other predetermined set point, and/or in response to a pre-determined digital signal.

When the device operates as a motor and the rotational speed of the rotor 62 is at or above a predetermined set point, and there is an electronic permissive (i.e. a signal present to request or permit the device to run), the device then switches from motor operation to generator operation. The external power supplied to the stator 72 may be stopped. Power may be supplied to the rotor 62 coils by an external power source or by way of self-excitation. Hydraulic pressure of the water, or the fluid, in the volute may drive the impeller blades, and concurrently drive the driveshaft that may be directly coupled to the rotor 62, or may be alternatively coupled to the rotor 62 via a clutch and flywheel assembly. The rotating rotor 62 induces a current in the stator 72, and this induced current may be fed from the stator 72 through contacts to external electrical storage or external electrical distribution. Electrical appurtenances such as a voltage regulator 64 and/or any other electrical components required to manage power generation from the device and power supply to the device are incorporated in the integrated motor-generator 14.

When the device operates in generator mode and the rotor 62 rotation speed falls below a pre-determined set point (and/or alternatively the rotor 62 rotates in the presence/absence of a pre-determined digital signal) and there is an electronic permissive for the device to run, the device is switched from generator operation to motor operation. Power supplied to rotor 62 coils by an external power source or by way of self-excitation may be stopped. An external power source supplies an electrical current to stator 72 windings 70. Stator 72 windings 70 induce a magnetic field that rotates the rotor 62. The rotor 62, which may be directly coupled to the drive shaft of the pump, which in turn may be directly coupled to the impeller blades, or alternatively coupled to the impeller blades via a flywheel and clutch assembly, drives the impeller blades to move water, or fluid, through the volute (fluid housing) of the centrifugal pump. When the respective rotor 62 of the integrated motor-generator 14 rotates below a pre-determined rotational speed and/or below some other predetermined set point, and/or alternatively based on a pre-determined digital signal, this initiates the switch for the device to operate in motor operation.

When the device operates in generator mode and the rotor 62 rotation speed falls below a pre-determined set point (and/or alternatively the rotor 62 rotates in the presence/absence of a pre-determined digital signal) and there is no electronic permissive for the device to run (and/or the device is being requested to stop), the device may be stopped. The device may be stopped, in the device configuration with or without a flywheel, when the rotor 62 rotation slows to a stop in synchronization with the impeller blades that slow with the decreasing flow of water, or fluid, through the volute. When the rotation of the rotor 62 reaches zero, the external power supply to the rotor 62, or the power supplied through the exciter 60, may be stopped. The device may also be stopped when the device is switched to regenerator braking mode. In the device configuration with a flywheel and clutch assembly, the clutch connecting the flywheel drive shaft to the impeller blade drive shaft is decoupled. The impeller blades are left to slow to a stop in synchronization with the decreasing flow of water, or fluid, through the volute. While the rotor 62 that is directly coupled to the drive shaft of the flywheel remains rotating with the flywheel inertia to slow to a stop when the rotation of the flywheel ceases, the rotating rotor 62 induces a current in the stator 72, this current may be transmitted from the stator 72 through contacts to an external power storage or to external electrical distribution. When the rotation of the rotor 62 reaches zero the external power supply to the rotor 62, or the power supplied to the rotor 62 from the exciter 60, may be stopped.

When the device operates in motor operation and there is no longer an electronic permissive for the device to run (the device may be requested to stop), the following may happen. In the device configuration without a flywheel, the device may be stopped. The rotor 62 rotation may slow to a stop in synchronization with the impeller blades that slow with the decreasing flow of water, or fluid, through the volute. The external power supplied to the stator 72 may be stopped. Alternatively, in the device configuration with a flywheel, the device may switch to regenerator braking operation: the clutch connecting the flywheel drive shaft to the impeller blade drive shaft may decouple the said drive shafts. The impeller blades may slow to a stop in synchronization with the decreasing flow of water, or fluid, through the volute. While the rotor 62 directly coupled to the drive shaft of the flywheel may rotate with the flywheel inertia to slow to a stop when the rotation of the flywheel ceases. The external power supplied to the stator 72 may be stopped. The power may be supplied to the rotor 62 coils by an external power source or by way of self-excitation. The rotating rotor 62 may induce a current in the stator 72. This current may be transmitted from the stator 72 through contacts to an external power storage or to external electrical distribution. When the rotation of the rotor 62 reaches zero or near to zero, the external power supply to the rotor 62, or the power supplied to the rotor 62 from the exciter 60, may be stopped.

Figure 6:
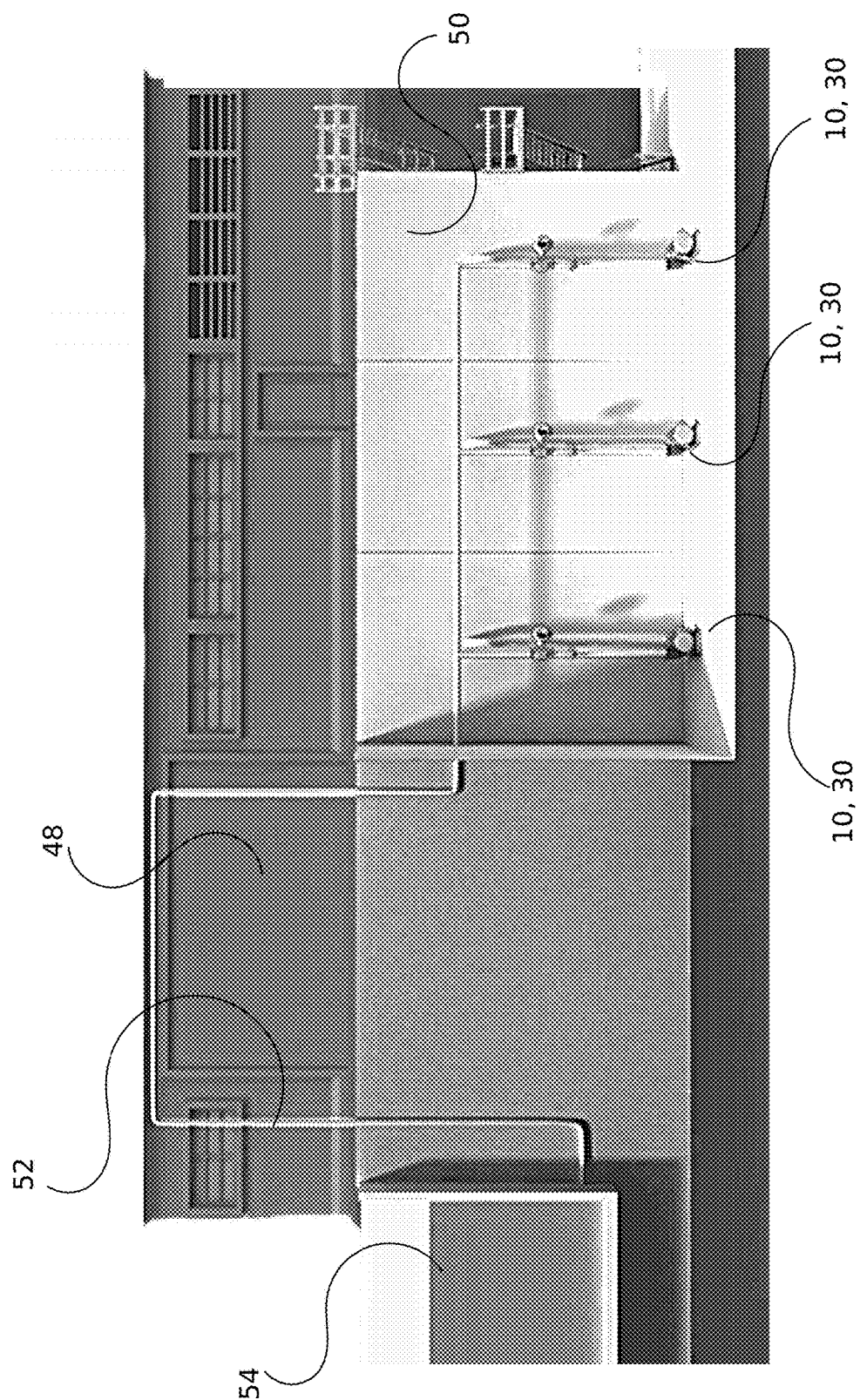
FIG. 6 is a schematic representation of a combined pump and turbine used within a water treatment plant and/or distribution pump station.

Turning now to FIG. 6, an embodiment of the combined pump and turbine 10 in a water treatment plant 48 is shown, comprising at least one combined pump and turbine 10 operably connected to a water storage tank 50, as well as a surge tank 54 operably connected to the combined pump and turbine 10 and one or more pipes 52. The combined pump and turbine 10 operates as a pump, to convey fluid flow from the water storage tank 50 into the surge tank 54, via the pipes 52, and/or as a turbine, to convert the mechanical energy from fluid flow between the water storage tank 50 and surge tank 54 into electrical energy. The combined pump and turbine 10 may act as a pump and/or turbine with or without siphon-driven fluid flow.

Figure 7:
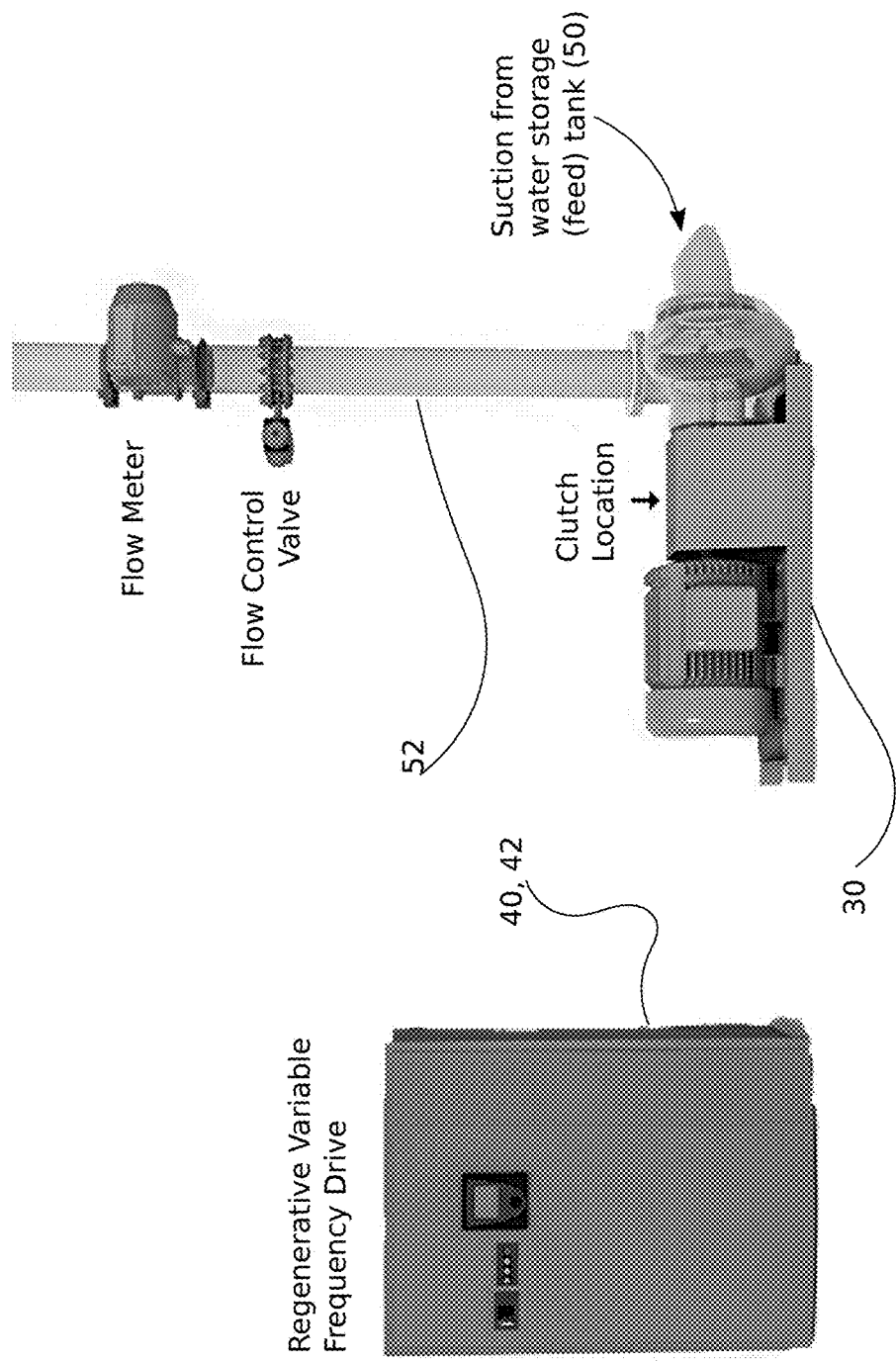
FIG. 7 is a schematic representation of a combined pump and turbine within a water treatment plant.

Turning now to FIG. 7, the schematic comprises the combined pump and turbine 10 used to start fluid flow in a water treatment plant 48 as depicted in FIG. 6. The combined pump and turbine 10 is electrically connected to a motor control unit 40 and regenerative variable frequency drive 46, of which are both physically and/or electrically connected to a main controller 42, and to pipes 52. This connection may be physical, mechanical, electrical, or wireless. The schematic further comprises, a flow control valve 38, a flow meter 34 and water storage tank 50. The motor control unit 40 and main controller 42 are used to power the combined pump and turbine 10 to operate as a pump to start fluid flow from the water storage tank 50. The flow control valve 38 is used to obstruct or permit fluid flow through pipes 52. More than one flow control valve 38 may be used with pipes 52. The flow meter 34 is used to measure the rate of fluid flow through pipes 52. More than one flow meter 34 may be used with pipes 52.

Figure 8:
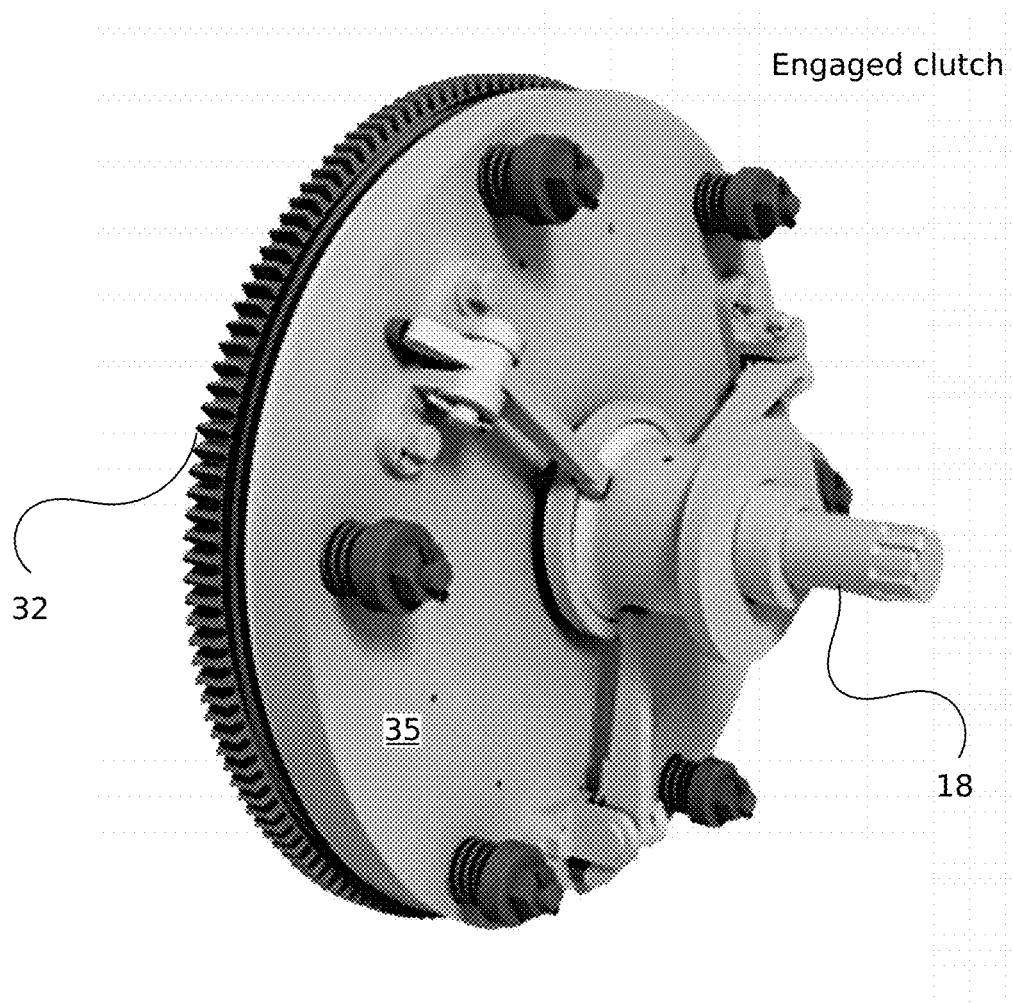
FIG. 8 is a representation of a clutch system used to operably connect a pump drive shaft and a motor drive shaft.

Referring to FIG. 8, the representation displays a clutch 35, a centrifugal mass 32 and pump drive shaft 18 contained within the combined pump and turbine. The clutch 35 is operably connected to the pump drive shaft 18. The centrifugal mass 32 is operably connected to an integrated motor-generator (IMG) drive shaft, as understood by a person having ordinary skill in the art. The clutch 35 may engage the centrifugal mass 32 with the pump drive shaft 18, such that the IMG drive shaft and pump drive shaft are operably connected. The clutch 35 may be protected by a clutch cover plate 31. FIG. 8 is one embodiment of the clutch 35 and does not exclude other embodiments to operably connect the pump drive shaft 18 to the IMG drive shaft.

Figure 9:
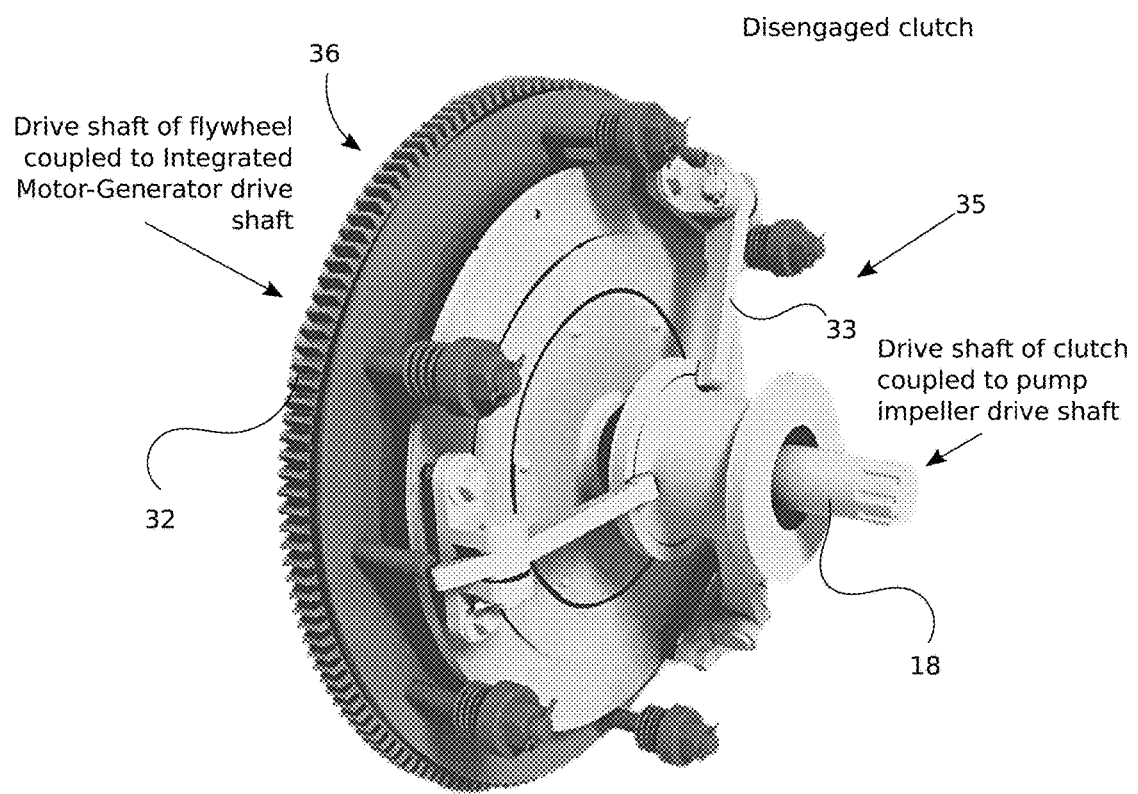
FIG. 9 is a representation of a clutch assembly for a combined pump and turbine used to operably disconnect a pump drive shaft from a motor drive shaft.

Turning now to FIG. 9, the representation depicts a clutch 35, a centrifugal mass 32, a pump drive shaft 18, a faceplate 33, and the clutch's distal side 36 where the motor drive shaft may be connected. The representation displays the clutch 35 without the clutch cover plate 31 of FIG. 8. During the clutch disengagement process, the clutch 35 disengages the pump drive shaft 18 from the centrifugal mass 32 that is operably connected to an IMG drive shaft. The clutch 35 disengagement is such that the pump drive shaft 18 is no longer operably connected to the IMG drive shaft. The representation shown in FIG. 9 depicts a face plate 33, operably connected to the pump drive shaft 18, disengaging from the centrifugal mass 32 by the clutch 35 disengaging operation. FIG. 9 is one embodiment of the clutch 35 and does not exclude other embodiments to operably disconnect the pump drive shaft 18 from the IMG drive shaft.

Figure 10:
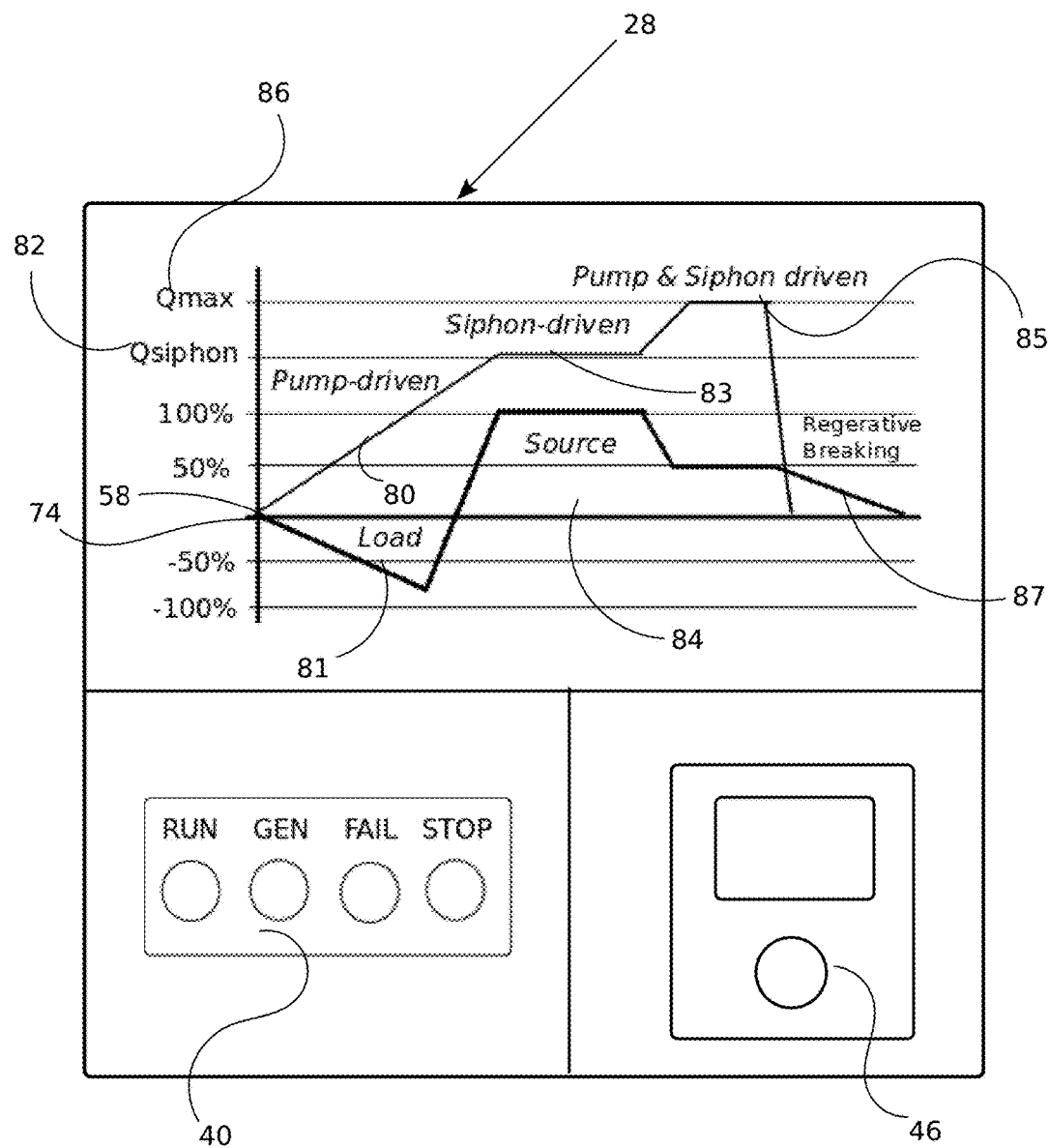
FIG. 10 is a graphical representation of a process or method for control of a combined pump and turbine.

FIG. 10 shows a graphical representation 28 of a process or method for control of the combined pump and turbine (CPT) 10 comprising measurement from a flow meter 58 and measurement from a bi-directional electricity meter 74. These measurements may be shown on a display screen, stored in memory and/or sent to another device or server. Flow meter measurement 58 of the fluid flow may be used as a process variable, as understood by a person having ordinary skill in the art. The process or method for control of the CPT 10 may attempt to minimize the difference between the current value of the process variable and a process set point, such as a flow set point. The flow set point may be defined by a variable frequency drive or an external controller, such as a programmable logic controller, as understood by a person having ordinary skill in the art. The difference between the process variable, flow meter measurement 58 and a flow set point, may be minimized by adjustment of control variables; specifically control of the power supplied to the combined pump and turbine 10, as shown in FIG. 7, during pump operation of the CPT 10; or by control of the position of a control valve 38, as shown in FIG. 7, during turbine operation of the CPT 10. Bi-directional electricity measurement 74 of the electricity consumed, or the electricity generated, for the CPT 10 may provide feedback (i.e. confirmation) for the current mode of operation of the CPT 10 and the presence/absence of siphon flow. This graphical representation also comprises representation of motor control unit 40 and regenerative variable frequency drive (RVFD) 46. The regenerative variable frequency drive 46 is electrically and operably connected to motor control unit 40, such that motor control unit 40 provides feedback and control for various modes of operation of the CPT 10 based on the speed and the electricity consumed or generated by the CPT 10. The motor control unit 40 may display the mode of operation of the CPT 10. The modes of operation of the combined pump and turbine comprise: RUN or motor ON operation, GEN or generator operation, FAIL or fault operation, and STOP or OFF operation. More than one mode may be simultaneously operational, e.g. RUN and GEN, or FAIL and STOP. The regenerative variable frequency drive 46 may comprise a variable frequency drive and regenerative converter. The regenerative variable frequency drive 46 may provide feedback (e.g. confirmation) of the integrated-motor generator speed, supply electrical energy to and/or absorb electrical energy received from the electromechanical converter and transfer absorbed electrical energy to a power source such as an electrical grid.

Graph 28 displays a sample process of the combined pump and turbine system 10. When the process begins, the combined pump and turbine 10 may be turned ON (from STOP to RUN) in order to start pumping fluid from the water storage tank 50 to the surge tank 54 via the pipes 52, as shown in FIG. 6. In this pump-driven phase 80, energy is expended by the combined pump and turbine 10. Because the net energy expended by the system is positive, or the net energy generated by the system is negative, the CPT 10 represents a load 81 on the system. In this phase 80, once the process variable, flow meter measurement 58, equates to a pre-defined process set point, Qsiphon flow rate 82, which may be a set-point to indicate siphon flow, the supplied power to the motor may be cutoff. In the siphon-driven phase 83, the mechanical energy of the fluid passing over the pump blades is converted into electrical energy. Because the net energy expended by the system is negative, or the net energy generated by the system is positive, the siphon-driven phase 83 allows the system to function as a source 84 of energy. In order to reach the process set point (i.e. flow set point), Qmax 86, which may be the maximum fluid flow speed for the system, in the pump-siphon driven phase 85, power is again supplied to the motor to work in conjunction with the siphon-driven flow. Though the net energy expended by the system is still positive in pump-siphon driven phase 85, the source energy 84 may decrease. During the regenerative braking phase 87, the system begins to shut down. The shutdown may occur because the system is switched to STOP or FAIL mode, power to the combined pump and turbine system is cutoff, the flow control valve 38, as shown in FIG. 7, is closed, and/or the pump blades are set to resist the flow of fluid such that the rate of fluid flow eventually goes to 0. In the regenerative braking phase 87, the rotational speed of the integrated motor-generator 14, as shown in FIG. 1, may remain above 0 for some time after the fluid flow through the pump blades has reached 0. During the regenerative braking phase 87, the net energy expended by the system is still negative, or the net energy generated by the system is positive, yet the system functions as a decreasing source 84 of energy.

Figure 11:
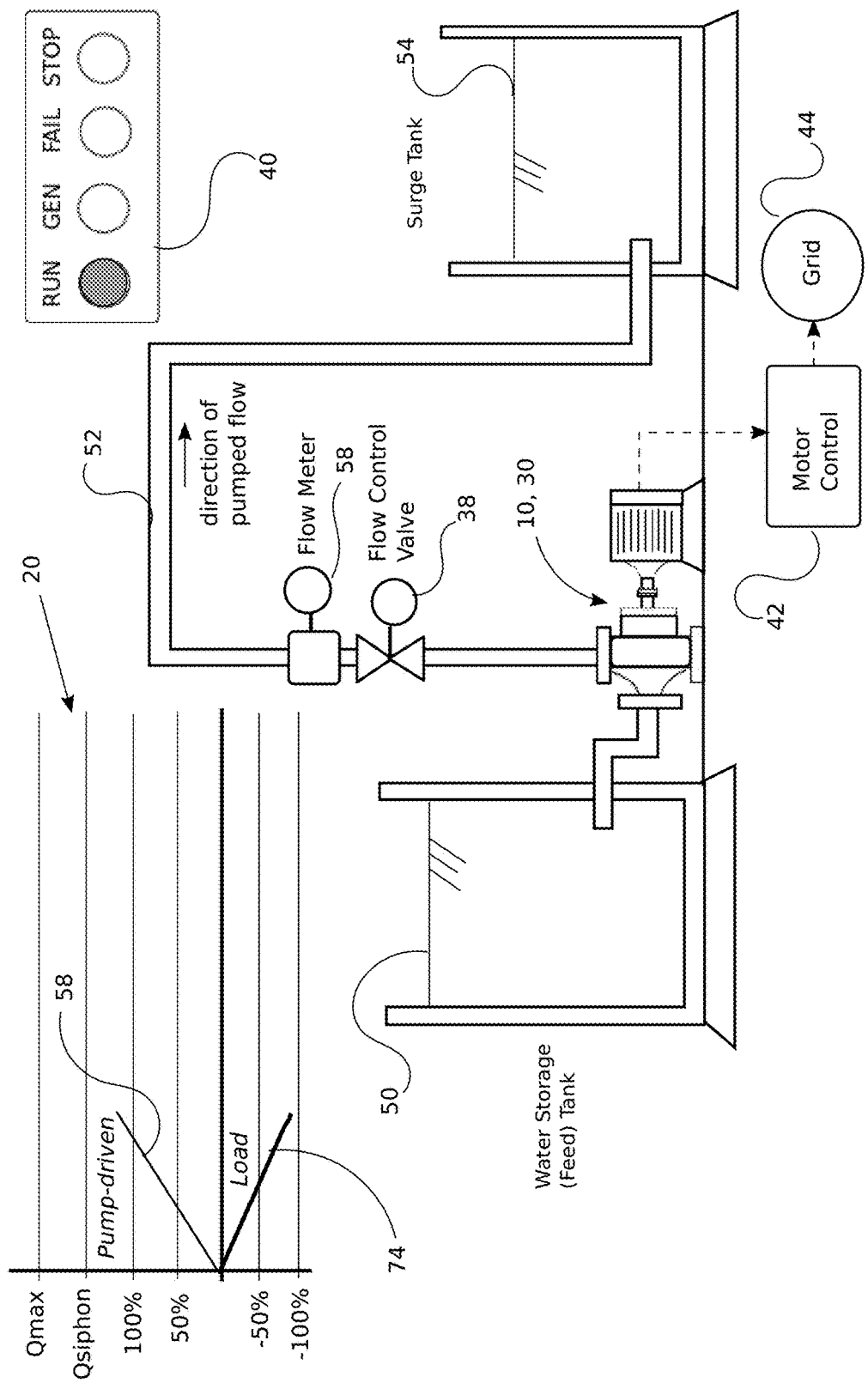
FIG. 11 is a schematic representation of a combined pump and turbine used within a water treatment plant.

Turning to FIG. 11, the combined pump and turbine system 10 may operate as a pump while there is transmission of power from an electrical grid meter 44 to the system via the main controller 42. The combined pump and turbine 10 may operate as a pump to start siphon flow by pumping liquid from the liquid storage tank 50 to the surge tank 54 through one or more pipes 52. The graphical representation 20 depicts an exemplary process or method comprising measurements from a flow meter 58 and a bi-directional electricity meter 74 to trigger at least one switch of the system from OFF mode to motor operation. A control switch may cause the motor control unit 40 to switch the system from OFF mode to motor operation ON. In other embodiments of the invention, a control switch may cause the motor control unit 40 to switch the system from motor operation to OFF.

Graph 20 also comprises a representation of a motor control unit 40 and a regenerative variable frequency drive 46. The regenerative variable frequency drive 46 has the capacity to recover the braking energy of a load moving faster than the designated motor speed (an overhauling load) and return it to the power system. The regenerative variable frequency drive 46 may work with AC, DC or a combination of both. When the motor is driven by a variable frequency drive (VFD), electric power delivered to the motor may be regenerated while the motor decelerates by applying negative torque to the motor shaft 18. The regenerative converter is a cost-effective solution that can replace a dynamic braking transistor and resistor network. It absorbs excess regenerative energy from the VFD and returns it to the ac power source. During motoring, the VFD may deliver power without the regenerative converter in the main power flow. So there is no conduction loss in the regenerative converter during motoring. When a motor turns faster than the speed designated by the variable frequency drive, the motor acts as a generator, generating power that is returned to a DC bus. The regenerative converter may be activated when regenerative energy charges DC link capacitors of the VFD. The regenerative converter may return stored energy in the DC capacitors to the grid 44. An active converter allows power to flow from the AC source to the DC bus and from the DC bus back to the AC source. A regenerative variable frequency drive puts the generated power back onto the line, and thereby reduces the total power consumption of the load. The regenerative variable frequency drive may comprise a three-phase active converter.

Figure 12:
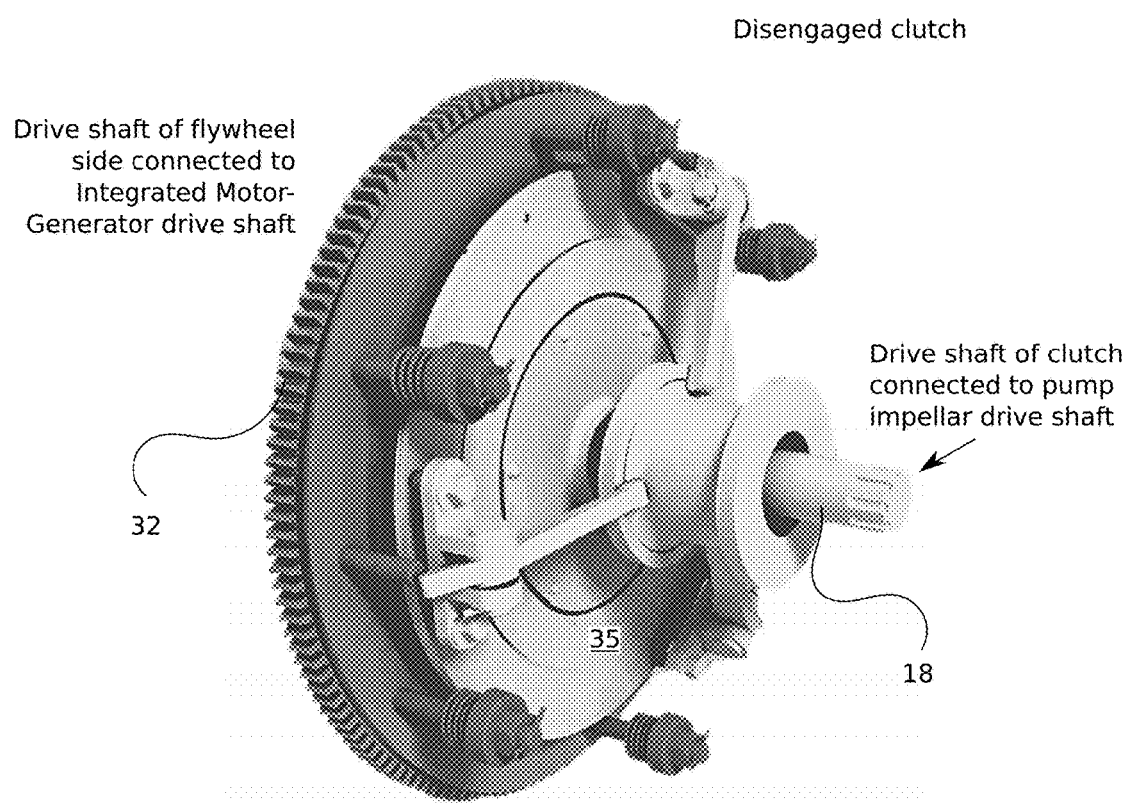
FIG. 12 is a schematic representation of a combined pump and turbine used as a turbine within a siphon-driven water treatment plant.

Turning now to FIG. 12, the schematic representation comprises the combined pump and turbine 10, electric grid meter 44, motor control unit 40, main controller 42, water storage tank 50 and surge tank 54. Pipes 52 contain siphon-driven fluid flow between the water storage tank 50 and the surge tank 54. The combined pump and turbine 10 may also be used as a turbine to convert mechanical energy from the siphon fluid flow contained in pipes 52 into electricity. The generated electricity is transmitted from the combined pump and turbine 10 to the electrical grid meter 44, or to alternate means of energy storage/transmission, via the motor control unit 40 and/or main controller 42. The graphical representation 22, which may comprise an LCD screen or other display unit, depicts the process variable, flow meter measurement 58, equal to a pre-defined process set point, Qsiphon flow rate. The said process variable, flow meter measurement 58, and/or the bi-directional electricity measurement 74, is used to trigger at least one switch from motor operation to generator operation of the combined pump and turbine 10, in the presence of siphon-driven fluid flow, while operating in the same direction. A control switch may cause the motor control unit 40 to start receiving power from the combined pump and turbine (CPT) 10 for generator operation, GEN, of the combined pump and turbine 10. The motor control unit 40 may be electrically connected a regenerative variable frequency drive 46. Moreover, the process or method disclosed herein is not exclusive to the presence of siphon-driven flow.

Figure 13:
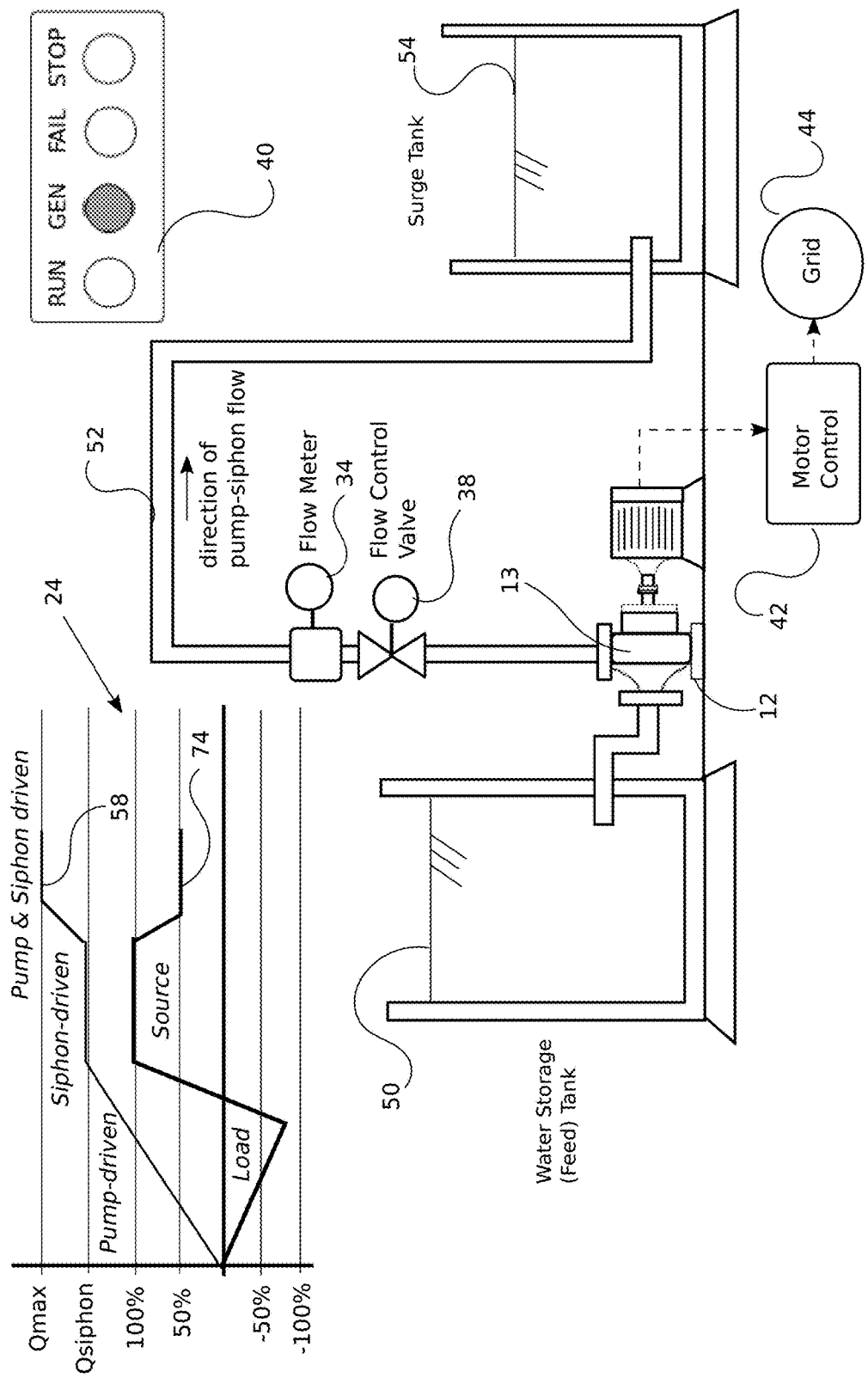
FIG. 13 is a schematic representation of a combined pump and turbine used in water treatment plant.

Turning now to FIG. 13, a schematic representation of the combined pump and turbine 10 used as a pump and turbine in the presence of siphon flow through pipes 52 between the water storage tank 50 and surge tank 54 is shown. The rate of flow of the liquid through pipes 52 is increased by the combined pump and turbine 10 that operates as a pump. The rate of flow of the liquid through the volute 13 of the centrifugal pump 12 is such that the system acts as both a pump and turbine concurrently, with the net effect of generating electrical energy. The said energy is transmitted to a grid meter 44, or to alternate means of energy storage/transmission, via the motor control unit 40 and/or main controller 42. The graphical representation 24 depicts the process variable, flow meter measurement 58, having a value above a pre-defined process set point, Qsiphon flow rate, and having a value at/below a pre-defined process set point, Qmax flow rate. The said process variable, flow meter measurement 58, and/or the bi-directional electricity measurement 74, is used to trigger at least one switch from generator operation to motor operation of the combined pump and turbine 10 in the presence of siphon-driven flow. The switch may result in the motor control unit 40 supplying power to the combined pump and turbine 10 for motor operation, RUN. The motor control unit 40 may be electrically connected to a regenerative variable frequency drive 46. Moreover, the process or method disclosed herein is not exclusive to the presence of siphon-driven flow.

Figure 14:
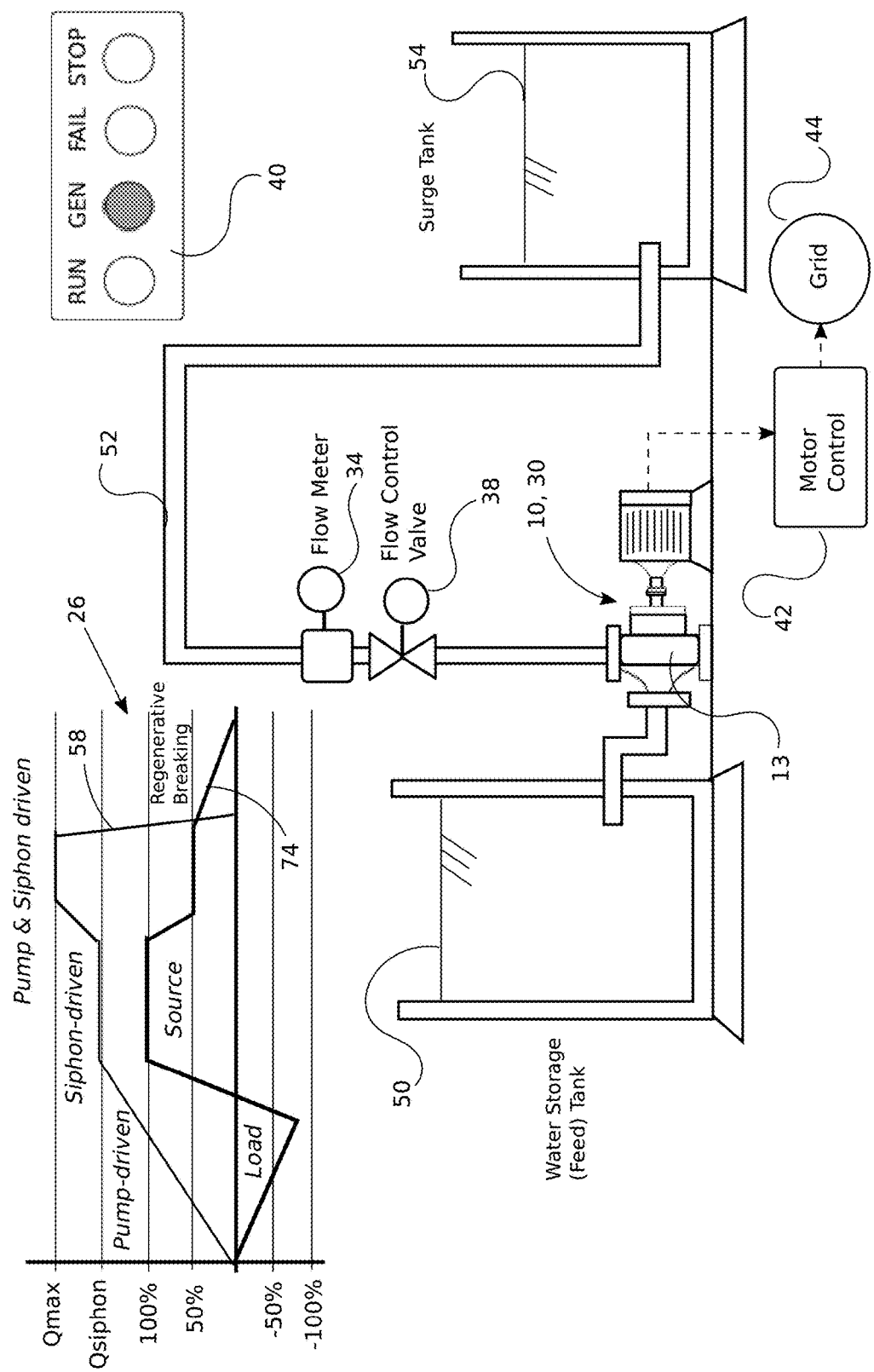
FIG. 14 is another schematic representation of a combined pump and turbine used in a water treatment plant.

Turning now to FIG. 14, a schematic representation of the combined pump and turbine 10 in arrangement with the water storage tank 50, motor control unit 40, main controller 42, grid meter 44, pipes 52 and surge tank 54 is depicted. In this embodiment, the combined pump and turbine 10 operates as a turbine when fluid flow in pipes 52 pathway is stopped by way of such an action as the flow control valve 38 closing to inherently obstruct the path of flow. In this embodiment, the combined pump and turbine 10 stores mechanical energy from the fluid flow in a centrifugal mass 32, of FIG. 9, while the pump drive shaft 18, operably connected to impellers, slows in time with the decreasing rate of flow through the pump volute 13. The centrifugal mass 32 of FIG. 9 powers the electromechanical converter in the combined pump and turbine 10 to produce energy and to output energy to a grid meter 44, or to alternate means of energy storage/transmission, by way of a motor control unit 40, regenerative variable frequency drive 46 and main controller 42. The graphical representation 26 depicts the process variable, flow meter measurement 58, below process set points, Qsiphon flow rate and/or Qmax flow rate. The said process variable, flow meter measurement 58, and/or the bi-directional electricity measurement 74 is used to trigger at least one switch from motor operation to generator/regenerative braking operation of a combined pump and turbine 10. Such an embodiment is not limited to the use of a centrifugal mass 32, and/or clutch 35 of FIG. 8. The switch may cause the motor control unit 40 to stop supplying power that the combined pump and turbine 10 was receiving under the generator operation, GEN, mode for pump and siphon-driven phase 85 of FIG. 10. Moreover, the aforementioned process or method disclosed herein is not exclusive to the presence of siphon-driven flow.

Figure 15:
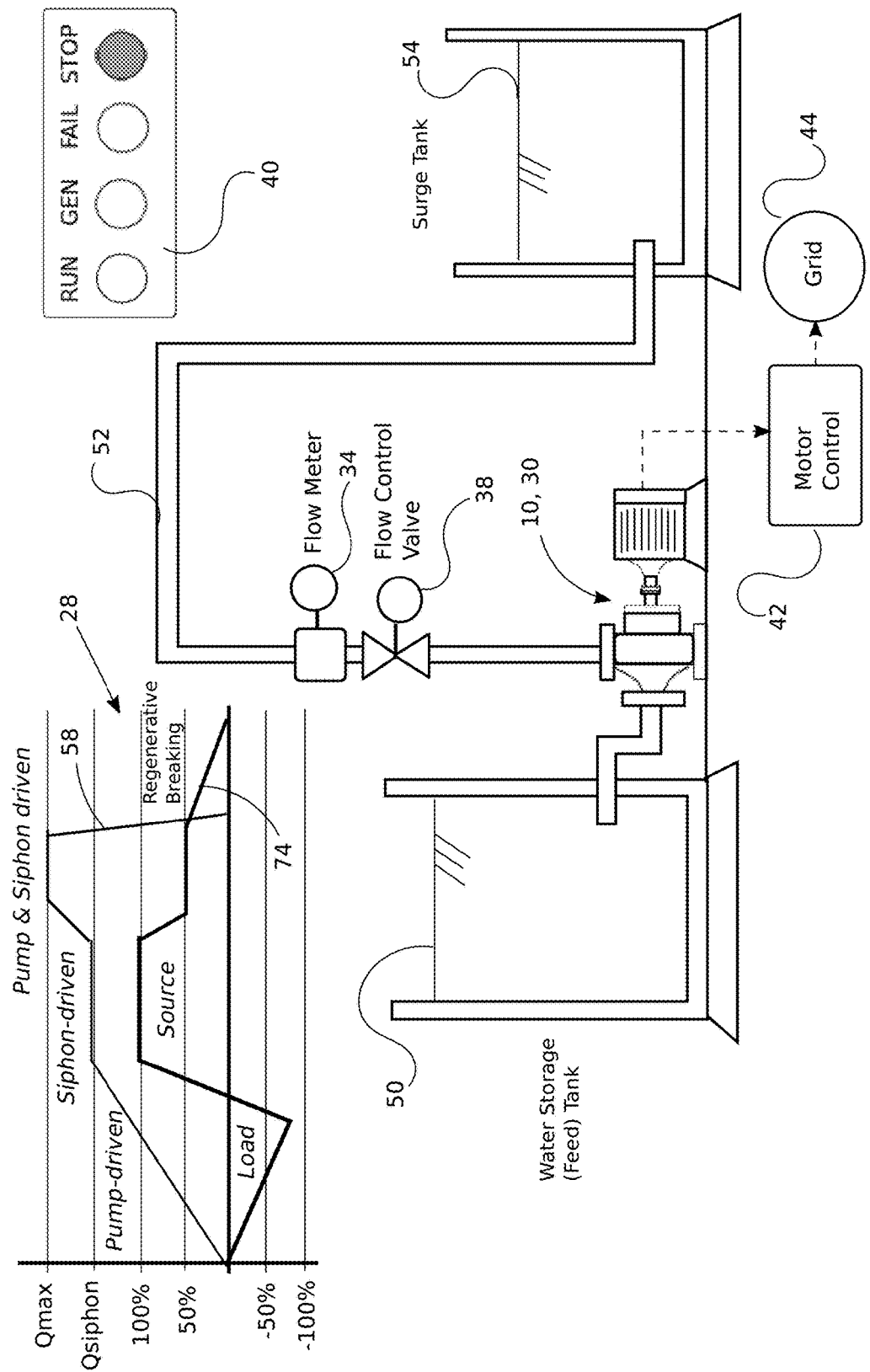
FIG. 15 is yet another schematic representation of a combined pump and turbine in a water treatment plant.

Turning now to FIG. 15, a schematic representation of the combined pump and turbine 10 in a water treatment plant 48 is shown. The combined pump and turbine 10 depicted is in an OFF state such that it neither operates as a pump or turbine. The rate of fluid flow along the pipes 52 pathway between the water storage tank 50 and the surge tank 54 is approximately equal to zero. Pipes 52 may be completely full or partially full. The motor control unit 40, main controller 42 and grid meter 44 may not supply or receive power from the combined pump and turbine 10. The graphical representation 28 depicts a process or method comprising measurements 58 from the flow transmitter 34 and measurements 74 from a bi-directional electricity meter to trigger at least one switch from generator operation to OFF of a combined pump and turbine 10. When the system switches to STOP/OFF, the motor control unit 40 ceases to supply power to the combined pump and turbine 10.

Generally speaking, the systems disclosed herein are directed to pumps and generators. Various embodiments and aspects of the disclosure have been disclosed and the description and drawings are illustrative of the disclosure and are not to be construed as limiting the disclosure. Numerous specific details are disclosed to provide a thorough understanding of various embodiments of the present disclosure. However, in certain instances, well-known or conventional details are not discussed in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

What is claimed is:

1. A hydroelectric system comprising:
 a combined pump and turbine comprising impeller blades;
 an electromechanical converter operably coupled to the combined pump and turbine, the electromechanical converter having a motor condition and a generator condition, wherein the motor condition drives liquid and the generator condition operates subject to a siphon flow;
 wherein the driven liquid and the siphon flow move in a same direction;
 a control unit operably connected to the electromechanical converter for switching the electromechanical converter between the motor condition and the generator condition; and
 wherein the impeller blades rotate in the same direction with the electromechanical converter when the electromechanical converter operates in the motor condition and in the generator condition.

2. The hydroelectric system of claim 1, wherein the electromechanical converter is a single electrical unit integrated motor-generator comprising:
 a stator;
 a rotor;

wherein the stator generates an electromagnetic field which causes the rotor to rotate when the electromechanical converter operates in the motor condition;

wherein the rotor generates a rotating magnetic field inducing a current in the stator when the electromechanical converter operates in the generator condition;

wherein the rotor rotates in the same direction in both the the generator condition and the motor condition.

3. The hydroelectric system of claim 1, wherein the combined pump and turbine is a centrifugal pump.

4. The hydroelectric system of claim 1, wherein the combined pump and turbine has a pump shaft and the electromechanical converter has a rotor shaft, wherein the pump shaft and the rotor shaft are a common drive shaft.

5. The hydroelectric system of claim 4, further including a flywheel operably connected between the combined pump and turbine and the electromechanical converter.

6. The hydroelectric system of claim 5, wherein the flywheel is operably connected to the electromechanical converter, wherein the flywheel is engaged and disengaged to the pump shaft responsive to a control from the control unit.

7. The hydroelectric system of claim 1, wherein the control unit comprises a regenerative variable frequency drive.

8. The hydroelectric system of claim 7, wherein the regenerative variable frequency drive controls a speed of the electromechanical converter.

9. The hydroelectric system of claim 1, wherein the combined pump and turbine is operably connected to a liquid storage tank and a surge tank.

10. The hydroelectric system of claim 1, wherein energy is produced when the siphon flow is in an uphill direction.

11. A method of starting fluid flow in a hydroelectric system comprising:
   starting a siphon flow by pumping liquid from a liquid storage tank through a combined pump and turbine using a motor condition of an electromechanical converter operably coupled to the combined pump and turbine;
   then, via the siphon flow, driving the liquid through the combined pump and turbine;
   powering the electromechanical converter to produce energy by switching the electromechanical converter to a generator condition using a control unit operably connected to the electromechanical converter;
   storing the energy; and
   outputting the liquid into a surge tank;
   wherein impeller blades of the combined pump and turbine rotate in a same direction with the electromechanical converter during the starting of the siphon flow and during the driving of the liquid.

12. The method of claim 11, wherein the electromechanical converter switches, at least once, between the motor condition and the generator condition while the impeller blades of the combined pump and turbine rotate in the same direction.

13. The method of claim 12, wherein the at least one switch is made based on a predetermined rotational speed.

14. The method of claim 12, wherein the at least one switch is made based on a predetermined set point.

15. The method of claim 12, wherein the at least one switch is made in response to a pre-determined digital signal.

16. The method of claim 12, wherein the at least one switch is made based on an electronic permissive.

\* \* \* \* \*